2,746,978

CORTISONE, 21-BETA-CYCLOPENTYL-PROPIONATE

Arnold C. Ott, Kalamazoo, Mich., assignor to The Upjohn Company, Kalamazoo, Mich., a corporation of Michigan No Drawing. Application September 1, 1951, Serial No. 244,859

1 Claim. (Cl. 260—397.4)

The present invention relates to therapeutically useful compositions having an exceptional physiological effect. More particularly, the invention relates to 4-pregnene-3,11,20-trione-17α,21-diol, 21-beta-cyclopentylpropionate and to physiologically active compositions containing the said ester.

It is an object of the present invention to provide the novel and useful organic compound, 4-pregnene-3,11,20-trione-17α,21-diol, 21-beta-cyclopentylpropionate which is very valuable due to its adrenal cortical hormone-like activity of a prolonged nature. A further object of the invention is the provision of novel therapeutic compositions containing the said compound. Other objects of the invention will be apparent to one skilled in the art to which this invention pertains.

It has now been found that the novel compound, 4-pregnene-3,11,20-trione-17α,21-diol, 21-beta-cyclopentylpropionate in the form of its solutions in a fluid vehicle, such as vegetable oils, glycols, thixotropic gels, or in the form of its microcrystalline suspensions in aqueous media, possesses a marked intrinsic as well as prolonged adrenal cortical hormone-like activity, which characteristic renders the said compound and compositions containing the same extremely useful in the treatment of certain physiological abnormalities, such as those due to an adrenal cortical hormone insufficiency. While it is well recognized in the art that certain esters of the same general class as 4-pregnene-3,11,20-trione-17α,21-diol, 21-beta-cyclopentylpropionate are possessive of the same general type of activity, none of the prior art compounds, so far as is known, exhibit the high order of activity, both of an intrinsic nature and prolonged effect.

The compound of the present invention can be prepared by reacting cortisone with beta-cyclopentylpropionyl chloride or bromide in the presence of a tertiary amine, such as pyridine or dimethylaniline, and thereafter recovering the desired ester from the mixture of reaction products. Beta-cyclopentylpropionyl chloride is obtained by reacting beta-cyclopentylpropionic acid with thionyl chloride, while the beta-cyclopentylbromide is obtained by reacting beta-cyclopentylpropionic acid with thionyl bromide.

The following examples are given to illustrate the preparation of the compound and compositions of the present invention, but are not to be construed as limiting.

*Example 1.*—Cortisone, 21 - beta - cyclopentylpropionate (4-pregnene-3,11,20-trione-17α,21-diol, 21 - beta-cyclopentylpropionate)

To one part of cortisone, M. P. 206–209° C., were added five parts of pyridine followed by two parts of beta-cyclopentylpropionyl chloride. After standing for 6 hours at room temperature, the mixture was taken up in diethyl ether, washed with cold one normal sodium hydroxide solution, one normal hydrochloric acid solution, and then washed to neutrality with water. The diethyl ether was removed by distillation and replaced with peroxide-free diisopropyl ether and allowed to crystallize. Fine needles of cortisone, 21-beta-cyclopentylpropionate resulted upon filtration, M. P. 158–161° C., $[\alpha]_D$ plus 190 degrees in chloroform, and $\epsilon_{239}$ 16,350 in ethanol.

This compound has the structural formula:

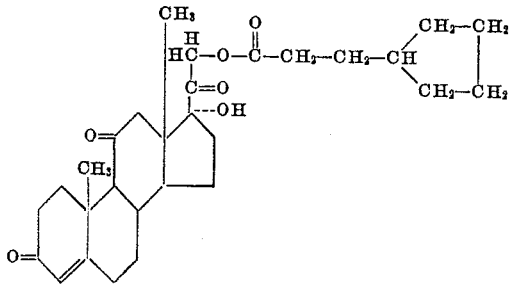

Cortisone, 21-beta-cyclopentylpropionate

Example 2

A solution of three parts of dry, crystalline cortisone, 21-beta-cyclopentylpropionate in twenty parts of diethyl ether was added with stirring to 100 parts of U. S. P. XII cottonseed oil contained in a 300-milliliter balloon flask. The flask was fitted with a capillary ebulliator attached to a stream of nitrogen, evacuated, and warmed on a steam bath. After about one hour, all of the ether had been removed and a clear oil solution remained. This solution contained three parts per thousand of cortisone, 21-beta-cyclopentylpropionate.

For preservation purposes, five parts of chlorobutanol per thousand of solution may be added either to the hot oil or to the ether solution of the ester.

In a similar manner, solutions of cortisone, 21-beta-cyclopentylpropionate are prepared using sesame, peanut, or corn oil.

Example 3

To a vigorously-stirred solution of three parts of cortisone, 21-beta-cyclopentylpropionate in 95 parts of peanut oil at 24 degrees centigrade, 1.9 parts of dry aluminum monostearate was added at a substantially uniform rate over a period of five minutes. The temperature of the mixture was then raised at the rate of ten degrees centigrade per minute until a temperature of 120 degrees centigrade was obtained, which temperature was maintained for ten minutes. Stirring was then discontinued and the clear syrupy product was allowed to cool at room temperature. There was thus produced 100 parts of a thixotropic gel containing thirty parts of cortisone, 21-beta-cyclopentylpropionate per thousand parts. Upon agitation, a free-flowing liquid suitable for injection after sterilization was obtained.

Example 4

One part of microcrystalline cortisone, 21-beta-cyclopentylproprionate was carefully added to a stirred solution of twenty parts of physiological saline containing five parts of a suspending agent consisting of a water-soluble polyalkylene oxide derivative of a partial long chain fatty acid ester of a polyhydric alcohol and stirring continued at room temperature for thirty minutes. The product was a suspension of microcrystals of cortisone, 21-beta-cyclopentylpropionate suitable after sterilization for parenteral administration.

Various modifications may be made in the present invention without departing from the spirit and scope thereof and it is therefore to be understood that I limit myself only as defined by the appended claim.

I claim:

Cortisone, 21-beta-cyclopentylpropionate.

References Cited in the file of this patent

UNITED STATES PATENTS

| | | |
|---|---|---|
| 2,265,183 | Miescher | Dec. 9, 1941 |
| 2,493,202 | Macek | Jan. 3, 1950 |
| 2,507,193 | Buckwalter | May 9, 1950 |

OTHER REFERENCES

Howard: Modern Drug Encyclopedia and Therapeutic Index, 4th ed., 1949.

Science News Letter, April 24, 1948, page 261.

Endocrinology, March 1946 (vol. 38), pp. 214–15.